United States Patent [19]

Lifflander

[11] Patent Number: 5,088,876
[45] Date of Patent: Feb. 18, 1992

[54] ARTICULATED TRACTOR-TRAILER HAVING ADJUSTABLE TRAILER LENGTH AND A TIPPABLE PLATFORM

[76] Inventor: Veikko Lifflander, Kanervantie 4 as 18, SF-58200 Kerimäki, Finland

[21] Appl. No.: 540,569

[22] Filed: Jun. 19, 1990

[30] Foreign Application Priority Data

Jun. 19, 1989 [FI] Finland ................. 892999

[51] Int. Cl.⁵ ................................. B60P 1/28
[52] U.S. Cl. ............................ 414/479; 414/494
[58] Field of Search ............... 414/474, 475, 476, 477, 414/478, 482, 483, 484, 498, 500, 479

[56] References Cited

U.S. PATENT DOCUMENTS

| | | | |
|---|---|---|---|
| 2,859,889 | 11/1958 | Love | 414/475 |
| 3,414,148 | 12/1968 | Bishop | 414/477 |
| 3,624,786 | 11/1971 | Lundahl | 414/475 |
| 3,690,490 | 9/1972 | Hall | 414/477 |
| 3,828,956 | 8/1974 | Dubo | 414/477 |
| 4,130,211 | 12/1978 | Abascal | 414/475 |
| 4,737,063 | 4/1988 | van den Pol | 414/500 X |
| 4,943,202 | 7/1990 | Galloway | 414/475 |
| 4,968,096 | 11/1990 | Chattin | 414/482 X |

FOREIGN PATENT DOCUMENTS

| | | | |
|---|---|---|---|
| 87846 | 9/1983 | European Pat. Off. | 414/498 |
| 0105043 | 4/1984 | European Pat. Off. | |
| 0136910 | 4/1985 | European Pat. Off. | |
| 3015408 | 10/1981 | Fed. Rep. of Germany | |
| 3447052 | 6/1986 | Fed. Rep. of Germany | |
| 969/67 | 4/1967 | Finland | |
| 771888 | 6/1977 | Finland | |
| 239806 | 3/1969 | U.S.S.R. | 414/477 |
| 899395 | 1/1982 | U.S.S.R. | 414/500 |
| 1418122 | 8/1988 | U.S.S.R. | 414/498 |

*Primary Examiner*—David A. Bucci
*Assistant Examiner*—Robert S. Katz
*Attorney, Agent, or Firm*—Eckert Seamans Cherin & Mellott

[57] ABSTRACT

The invention concerns a tractor comprising a front frame (1) and a rear frame (5) linked together by a hinge (7) with a vertical pivot and by a power cylinder for the steering of the tractor. In the tractor of the invention, the rear frame (5) consists of an interior body (9) and an exterior body (10) which are telescopically movable relative to each other using a power cylinder (8), the exterior body being provided with a tipping device (11) and a power cylinder (12) for the tipping of a platform placed on the tipping device.

1 Claim, 2 Drawing Sheets

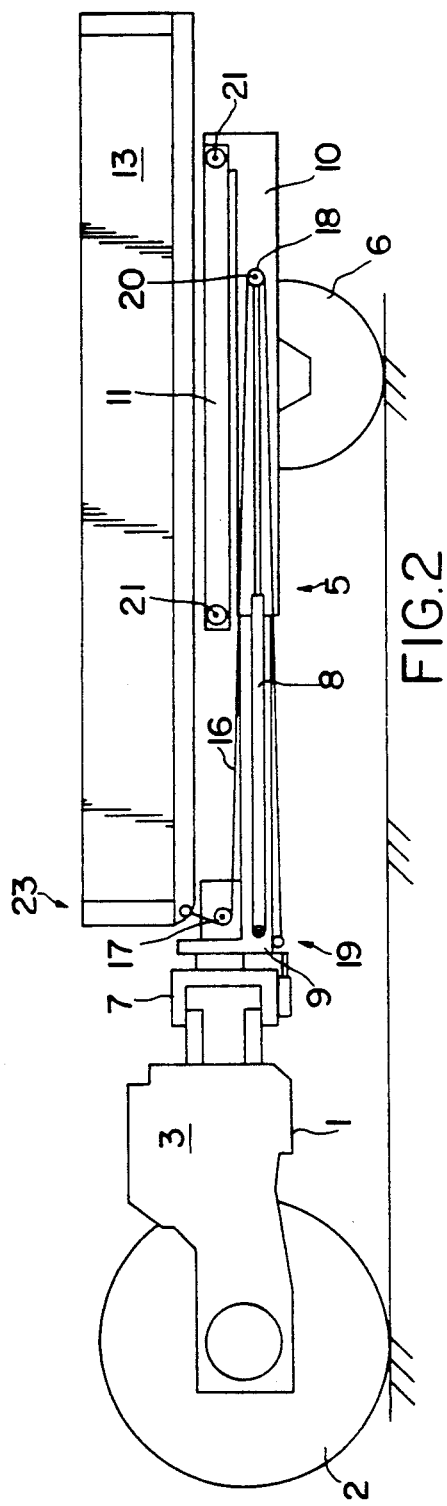
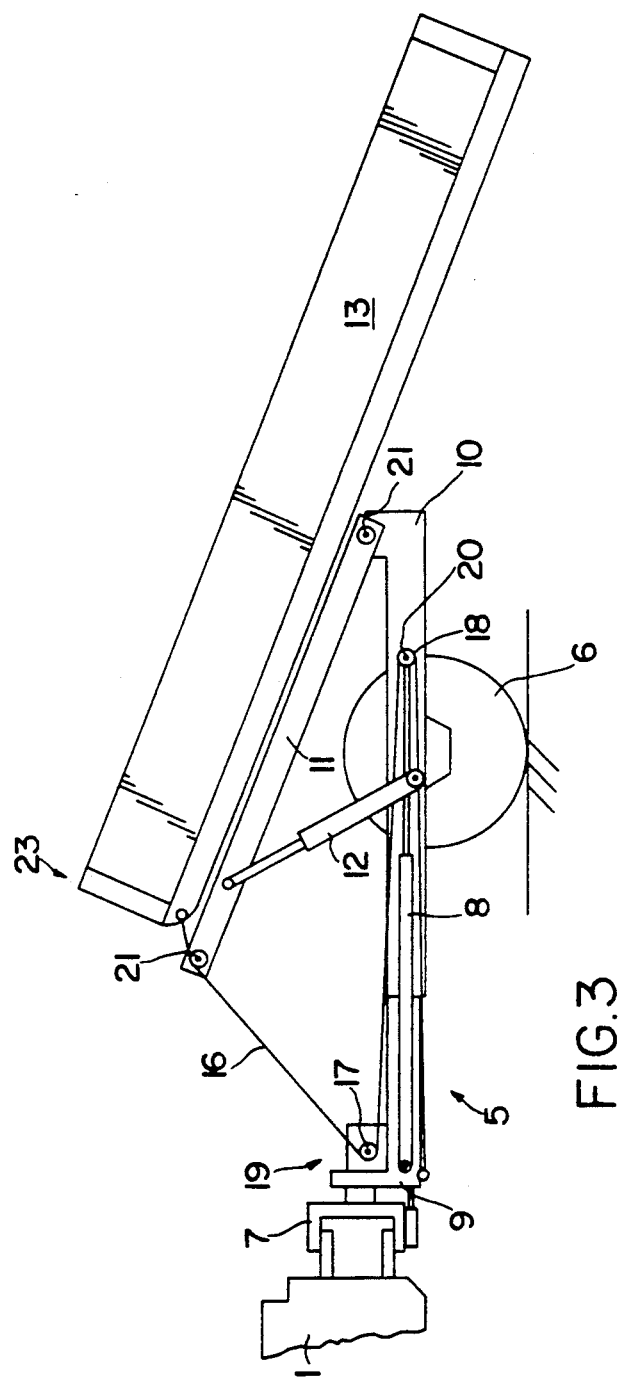

ARTICULATED TRACTOR-TRAILER HAVING ADJUSTABLE TRAILER LENGTH AND A TIPPABLE PLATFORM

FIELD OF THE INVENTION

The present invention relates to a tractor or an equivalent vehicle, comprising a front frame which has a pair of wheels, an engine and a control cabin, and a rear frame which has a second pair of wheels, the front and rear frames being linked to each other by a hinge with a vertical pivot and by a power means for the steering of the tractor.

BACKGROUND OF THE INVENTION

At present, there are a large number of various tractors and similar vehicles which are usable for certain purposes in agriculture and forestry but are practically unusable for other purposes. For example, most vehicles designed for forest work can not be used in farm or garden work, and tractors designed for farm work are ill suited for forest work.

SUMMARY OF THE INVENTION

The object of the present invention is to eliminate the drawbacks referred to. A specific object of the invention is to achieve a tractor or an equivalent vehicle which can be used for a variety of purposes, e.g. for sowing and ploughing work like an ordinary tractor, as a light and smart vehicle for moving or transporting small loads, and for moving large amounts of goods by a technique replacing the conventional tractor-and-trailer combination.

The tractor of the invention comprises a front frame which is provided with a pair of wheels, an engine and a control cabin, and a rear frame which has a second pair of wheels. The front and rear frames are linked to each other by a hinge with a vertical pivot and by a suitable power means, e.g. a hydraulic cylinder, which is used for the steering of the tractor, i.e. the tractor employs frame steering. The rear frame of the tractor of the invention consists of an interior body and an exterior body which are telescopically movable relative to each other using a power means, the length of the rear frame being adjustable within certain limits. The hinge with a vertical pivot is attached to the interior body while the wheels are mounted on the exterior body, which is also provided with a tipping device and a power means for tipping a platform mounted on the tipping device. Thus, when the rear frame is in the retracted position, the tractor of the invention can be used as a normal tractor for farm or forest work, and the front frame can be equipped with suitable implements, and it is also possible to place certain implements on the rear frame. The rear frame can also be used as as a low loader or it can be provided with a small platform. When the rear frame is in the extended position it can be provided with a long platform and the tractor can be used like a normal tractor with a trailer, but it will be lighter in operation because the unit has one pair of wheels less.

In a preferred embodiment, the control unit and seat provided in the operator's control cabin are turnable through 180°, so that the operator can always sit facing to the direction of movement regardless of the mode of operation of the tractor.

In a preferred embodiment, the platform on the tipping device is linked to the interior body by suitable pulling means such as wire cables passing from the inner end of the platform over first guides such as rollers mounted on the interior body and second guides such as rollers mounted on the exterior body back to the interior body, to which the other ends of the wire cables are fastened. In addition, both ends of the tipping device are preferably provided with suitable guides, e.g. corresponding rollers, so that only two power means, i.e. the tipping power means and the power means for the adjustment of the rear frame extension, are needed for the tasks of bringing the platform onto the tipping device and moving it away from it again, tipping the platform on the tipping device and adjusting the extension of the rear frame.

As compared to previously known techniques, the tractor of the invention has the advantage that it enables one and the same vehicle to be used for several different purposes in the fields of farming and forestry, which is not possible when currently known tractors are used, thus allowing considerable savings to be achieved in investments on machinery.

BRIEF DESCRIPTION OF THE DRAWINGS

In the following, the invention is described in detail by referring to the appended drawings, wherein:

FIG. 2 represents the tractor of FIG. 1 with the frame in the extended state; and FIG. 3 illustrates the tractor of FIG. 1 in a situation where the platform is being tipped and moved off the tractor.

DESCRIPTION OF THE PREFERRED EMBODIMENT

Figure 1:
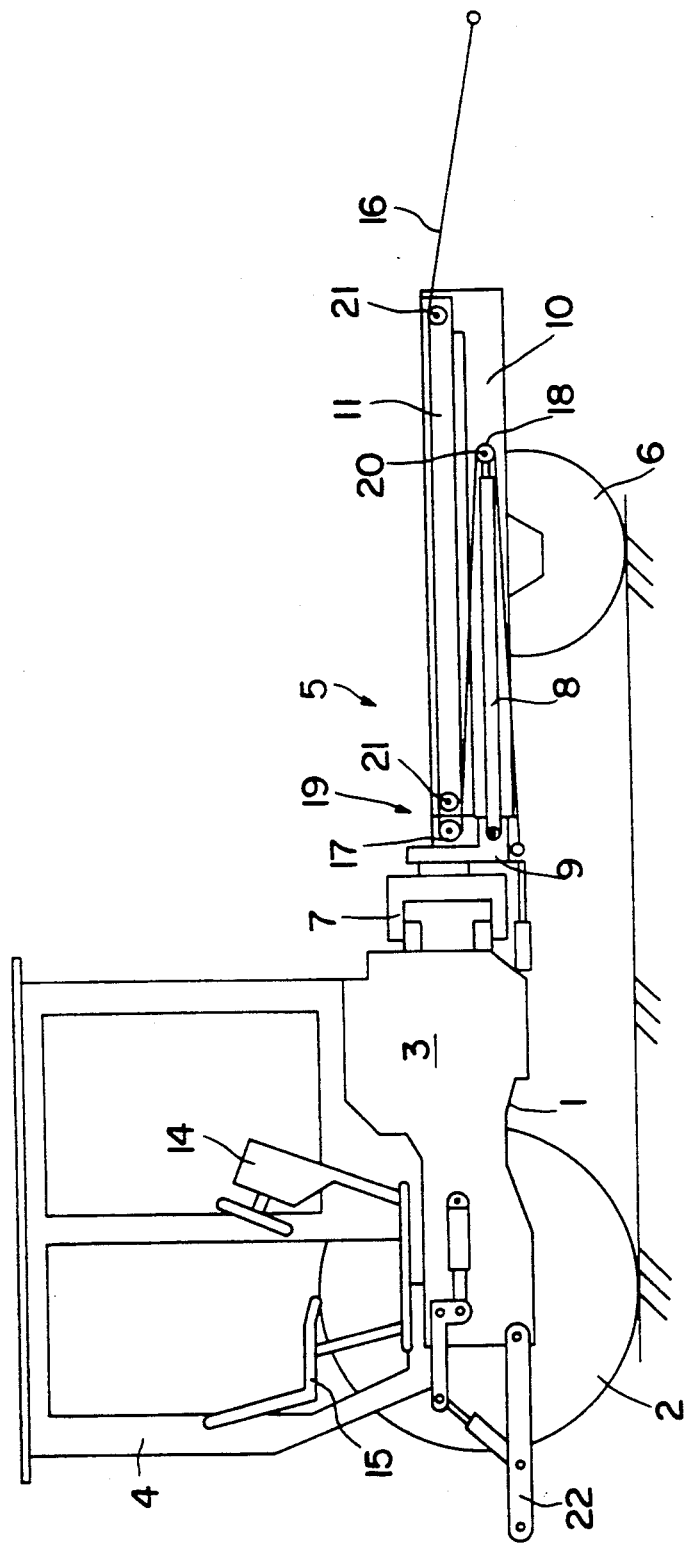
FIG. 1 shows a diagrammatic side view of the tractor of the invention with the frame in the retracted state.

The vehicle illustrated by the drawings comprises a front frame 1 provided with a pair of wheels 2, an engine 3 and an operator's control cabin 4 with a control unit 14 and a seat 15. In addition, the tractor comprises a rear frame 5 provided with a second pair of wheels 6, the front and rear frames being linked to each other by a vertical hinge 7 and a suitable power means enabling the front and rear frames to be pivoted in relation to each other in a manner known in itself from various vehicles, i.e. the tractor employs frame steering.

The rear frame 5 consists of an interior body 9 and an exterior body 10 which are telescopically movable relative to each other using a power means 8, e.g. a hydraulic cylinder, by means of which the length of the rear frame can be adjusted within certain limits. In this two-part frame 5, the hinge 7 is attached to the interior body 9 while the wheels are mounted on the exterior body 10. In addition, the exterior body 10 is provided with a tipping device 11 pivotally mounted on its outer end. The tipping device is operated using a hydraulic cylinder 12 whose one end is connected to the exterior body 10 and the other end to the tipping device 11.

Mounted on the tipping device 11 is a detachable platform 13, the wire cables used as pulling means 16 being detachably attached to each side of its inner end 23 (only one of the wire cables is shown in the figure). These wire cables run from the platform over first rollers 17 mounted on the inner end 19 of the interior body and second rollers 18 mounted at the fulcrum 20 of the piston rod of cylinder 8 on the exterior body back to the interior body 9, to which the other ends of the wire cables are fastened. In this embodiment, these other ends of the wire cables extend to the inner end 19 of the interior body 9 and are fastened thereto, but they could as well be fastened to some other point on the interior body. In addition, both ends of the tipping device 11 are provided with corresponding rollers 21, over which the wire cables can freely run when the platform is being moved along the tipping device.

Moreover, the tractor illustrated in the drawings is provided with anchoring elements 22 known in themselves, e.g. a three-point anchorage, which can hold various agricultural implements such as ploughs, harrows, sowers, etc.

The frame structure of the invention functions as follows. As illustrated by FIG. 2, when the rear frame 5 is in the extended form, it can carry a long platform body, corresponding to an ordinary tractor with a trailer. When the platform is to be tipped or removed, the tipping device 11 is raised by means of hydraulic cylinder 12 and simultaneously cylinder 8 is operated to telescope the interior 9 and exterior 10 bodies into each other. The platform, controlled by means of the wire cable 16, will now slide downwards along the tipping device at a speed determined by the rate of retraction of cylinder 8. When the outer end of the platform 13 touches the ground and is supported by it, the tractor is driven forward so that the platform will slide down from the tipping device 11 while the interior and exterior bodies 9,10 telescope into each other, i.e. to the position shown in FIG. 1.

The wire cables 16 can now be detached from the platform, the interior and exterior bodies 9,10 can be interlocked and the tractor can be used like a conventional agricultural tractor, which practically means that the front frame 1 is turned into a rear frame and the rear frame 5 into a front frame, because the outer end of the front frame 1 is provided with suitable anchoring elements 22 for various implements. Moreover, in this retracted form the rear frame 5 can be used to carry smaller loads or various suitable implements, such as squirt guns and containers for plant-protecting agents. When the platform 13 is to be remounted on the tractor, the wire cables 16 are attched to the inner end 23 of the platform and, by operating cylinder 8 only, the exterior body 10 is pushed out so that it is essentially separated from the interior body 9. Simultaneously, the wire cables 16 will pull the platform into the position shown in FIG. 2, whereupon the interior and exterior bodies can be interlocked and the platform can be locked in place.

In the above, the invention has been described in detail by referring to one of its preferred structural implementations, but different embodiments of the invention are possible within the scope of the following claims.

What is claimed is:

1. Tractor comprising a front frame which has a first pair of wheels, an engine and an operator's control cabin, and a rear frame which has a second pair of wheels, the front and rear frames being linked to each other by a hinge with a vertical pivot and by a steering power means for the steering of the tractor, wherein the rear frame consists of an interior body and an exterior body which are telescopically movable relative to each other using a sliding power means, the hinge being attached to the interior body while the second pair of wheels are mounted to the exterior body, the exterior body being provided with a tipping device and a tipping power means for tipping a platform body placed on the tipping device, the platform body being connected to the interior body by flexible pulling means passing over a first guide mounted on the interior body and a second guide mounted on the exterior body, wherein said sliding power means is a hydraulic cylinder and piston unit attached to the interior body and the exterior body, said cylinder and piston unit attached to the exterior body at a fulcrum, said second guide being a roller mounted near said fulcrum.

* * * * *